United States Patent [19]
Alley

[11] 3,771,559
[45] Nov. 13, 1973

[54] DAMPER
[75] Inventor: Raymond L. Alley, Toledo, Ohio
[73] Assignee: The American Warming & Ventilating, Inc., Toledo, Ohio
[22] Filed: Apr. 10, 1972
[21] Appl. No.: 242,643

[52] U.S. Cl.................... 137/601, 49/91, 98/110, 98/121 A
[51] Int. Cl............................................. F16k 13/00
[58] Field of Search.................. 137/601, 512.1; 98/107, 110, 112, 113, 121 A, 121 R; 49/74–78, 91, 92

[56] References Cited
UNITED STATES PATENTS

| | | | |
|---|---|---|---|
| 2,805,453 | 9/1957 | Petronello et al. | 49/91 X |
| 3,275,031 | 9/1966 | Alyea et al. | 137/601 |
| 2,279,425 | 4/1942 | Voysey | 98/110 X |
| 3,464,341 | 9/1969 | Dobrin | 98/110 |
| 3,123,098 | 3/1964 | Bishop | 137/601 |

Primary Examiner—Robert G. Nilson
Attorney—Carl F. Schaffer et al.

[57] ABSTRACT

A damper for controlling the flow of gases through an opening. The damper has a rectangular frame which defines the opening and a plurality of blades rotatably mounted in the frame by parallel spaced axes. The blades are operatively connected through the axes to be rotated together to close off, to open, or to partly close the opening defined by the frame. All of the blades have air-foil cross-sections of substantially identical shape. Alternate blades have resilient noses and tails which act as gaskets in contacting the respective solid tails and noses of intermediate blades and in contacting members of the frame which extend parallel to the axes of the blades, when the damper blades are in closed position.

3 Claims, 6 Drawing Figures

Patented Nov. 13, 1973 3,771,559
2 Sheets-Sheet 1
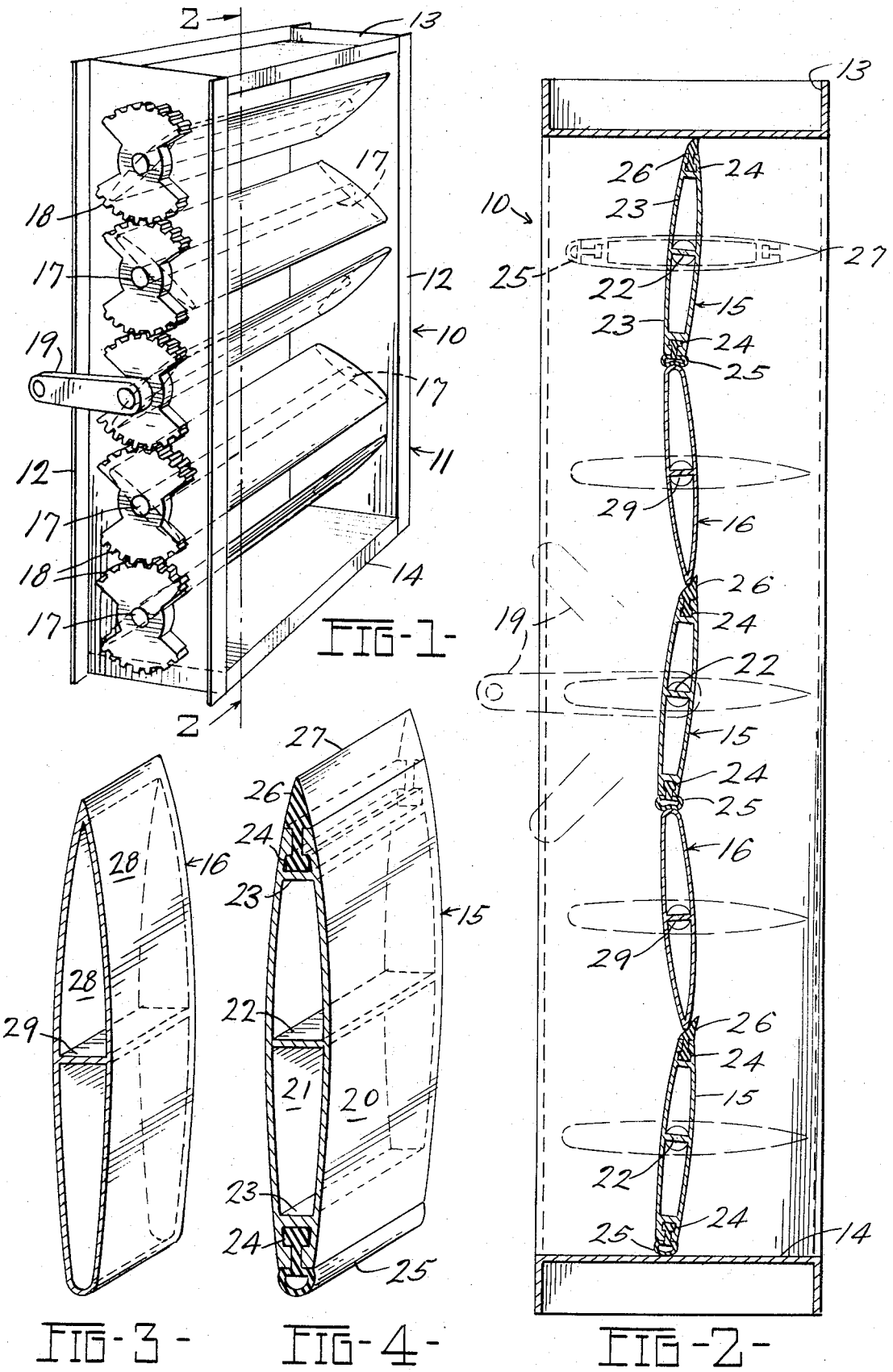

Patented Nov. 13, 1973
3,771,559
2 Sheets-Sheet 2
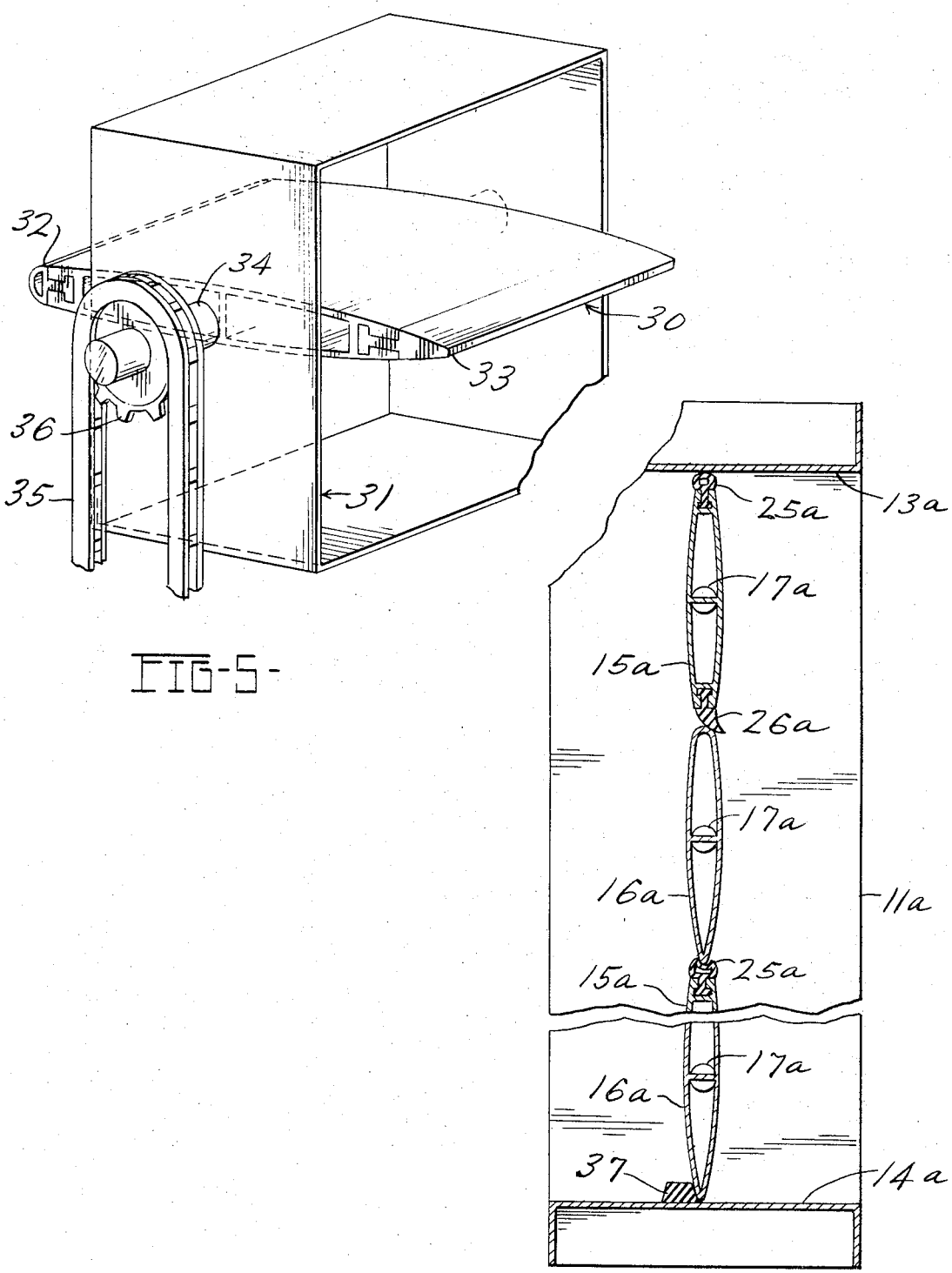
FIG-5-
FIG-6-

DAMPER

BACKGROUND OF THE INVENTION

A damper for an opening such as a duct or ingress or egress opening in a closed area through which gases flow, must be movable to an open position in which the blade or blades of the damper interfere as little as possible with the flow of gases through the opening and to a closed position in which the opening is substantially free of leakage. Blade type dampers have been suggested in the past wherein the blades are fabricated from formed strips of metal, from extruded metal and from combinations of metal, rubber and/or plastic. Some of these dampers have utilized blades which have resilient edges so that when the damper blades are swung into closed position the resilient edges are compressed against each other for sealing the damper. Such a damper is shown in Scharres U.S. Pat. No. 3,084,715 wherein all of the damper blades have resilient edge portions which are brought into contact when the damper is closed.

One of the problems with a damper such as that disclosed in the mentioned Scharres patent is that the provision of resilient edges on all of the damper blades not only increases the cost of manufacture but also leads to a relatively short life particularly when the damper is subjected to temperatures which shorten the life of the resilient material on all edges of all blades.

Another problem encounterd with many dampers of this general type results from the blade configuration, particularly in high velocity air flow, such as 3000 f.p.m. or the like, where the blades not only interfere with the flow but are noisy.

BRIEF DESCRIPTION OF THE DRAWINGS

FIG. 1 is a view in perspective of a damper according to the invention, showing the blades partially open for purposes of illustration, although such a setting is not of importance since the damper of the invention is most effective either at its fully closed or fully open positions;

FIG. 2 is a vertical, sectional view taken along the line 2—2 of FIG. 1 and shown on an enlarged scale with the blades of the damper embodying the invention shown in closed position in solid lines and in open position in phantom;

FIG. 3 is a still further enlarged isometric view of a portion of one of the two types of blades according to the invention; and FIG. 4 is a view similar to FIG. 3 but showing the other type of blade according to the invention;

FIG. 5 is a view in perspective illustrating a damper employing a single blade constructed according to the invention; and FIG. 6 is a fragmentary view similar to FIG. 2 but showing a damper embodying the invention with the blades arranged differently.

DESCRIPTION OF PREFERRED EMBODIMENTS

A damper embodying the invention is generally indicated by the reference number 10 and comprises, among other parts, a rectangular frame 11 consisting of parallel side members 12 and top and bottom members 13 and 14, respectively. The frame 11 defines an opening through which the gases pass when the damper is open. In this embodiment the opening is closed by a plurality of damper blades consisting of two types, alternate blades 15 (FIG. 4) and intermediate blades 16 (FIG. 3).

All of the damper blades 15 and 16 are rotatably mounted in the frame 11 on axes 17 carried by the side frame members 12 and extending parallel to each other and parallel to the top and bottom frame members 13 and 14. The blades are simultaneously rotated when it is desired to either open or close the damper 10 and are operatively connected to each other by a series of sector gears 18, in the illustrated embodiment each of the gears 18 being pinned or otherwise secured on one of the axes 17 and being meshed with each other in series as shown in FIG. 1. Operative means for rotating the damper blades 15 and 16 is shown in FIG. 1 as comprising a lever 19 which, for example, may be driven by any suitable mechanism such as a motor actuated in response to change in temperature, change in velocity or other signal. Neither the sector gears 18 nor the means for operating them constitute a part of the instant invention.

All of the alternate blades 15 are substantially identical in rectangular plan configuration and in air-foil cross-section. Each of the blades 15 consists of opposed, elongated main surface members 20 and 21 which are slightly curved in shape and are connected to each other at their midpoints by an elongated cross web 22. At the corresponding edges of the main surface members 20 and 21, they are connected to each other by cross webs 23 and elongated "T"-slot 24 provided at each edge. It will be perceived that in the preferred embodiment, the blade elements 20, 21, 22 and 23 are all parts of a single extrusion.

An elongated, resilient nose piece 25 is engaged in the slot 24 at one edge of each blade 15, the nose piece 25 having a rounded outer end blending into the shape of the edge of the blade in order to provide an "air-foil" nose on the blade 15. Similarly, at the opposite edge of the blade 15, an elongated resilient tail piece 26 is similarly engaged in the respective slot 24 and again blends in with the surface contours of the blade to provide an "air-foil" tail, the tail piece 26 ending in a relatively sharp edge 27.

Each of the intermediate blades 16 has a plan configuration substantially identical with the plan configuration of the alternate blades 15 and an air-foil cross-section substantially identical with the cross section of the blade 15 including the nose piece 25 and tail piece 26. The blade 16 comprises two surface elements 28 of identical though opposed configuration, and a median cross web 29. As is also apparent, the entire blade 16 may be fabricated as a unitary extrusion. Not only are the cross sections of the blades 15 and 16 and their plan shapes substantially identical, but, the two central cross webs 22 and 29 are positioned at the same distances from the respective noses and tails of the two blades 15 and 16.

All of the blades 15 and 16 may advantageously be mounted in the damper 10 through the use of split axles as are disclosed in Johnson U.S. Pat. No. 3,191,241.

Because of the inter-meshing of the sector gears 18, the alternate blades 15 and intermediate blades 16 are rotated in opposite directions when the actuating lever 19 is swung angularly to move the blades 15 and 16 between the closed position shown in solid lines in FIG. 2 and the open position shown in phantom in FIG. 2. A comparison of the solid closed and broken line open positions as illustrated in FIG. 2 shows that when the blades 15 and 16 are in open position, all of their noses extend in the same direction into the oncoming air and all of their tails extend downstream in the air flow. By thus positioning the blades 15 and 16 in the air flow in open position, the full advantage of their cross section is utilized to smooth out the flow of air so that both pressure drop through the damper 10 and air passage noise are minimized. Since dampers of this type are often used in openings through which air may flow at a velocity of 3,000 feet per minute or more, the minimizing both of pressure drop and noise is extremely important.

When it is desired to close a damper embodying the invention, the mechanism to rotate the sector gears 18 is activated and the blades 15 and 16 are swung in opposite directions from their open (phantom) position as shown in FIG. 2 to the closed position illustrated in FIG. 2 in solid lines. It will be observed in FIG. 2 that in closed position, the blades are engaged in nose-to-nose and in tail-to-tail contact. The resilient nose pieces 25 of the alternate blades 15 are collapsed in engaging the solid noses of the intermediate blades 16 and the resilient tail pieces 26 overlap the tails of the intermediate blades 16. This assures a tight seal between the engaging noses and overlapping tails of the two types of blades in closed position.

It will also be seen in FIG. 2 that in a damper embodying the invention, it is not necessary to provide additional sealing means on the top and bottom frame members 13 and 14. With alternating blades of the two types, the blades 15 can be utilized at both the top and bottom of the damper 10 so that a resilient nose piece 25 of the bottom-most one of the alternate blades 15 is compressed against the bottom member 14 of the damper 10 and a resilient tail piece 26 of the uppermost one of the blades 15 is tightly pressed against the top frame member 13.

So spacing the axes 17 of a damper embodying the invention that engagement of the two types of blades in nose-to-nose contact occurs and overlapping of the two types of blades in tail-to-tail contact occurs, results in providing an extra safety element of sealing contact. Even if the resilient nose pieces 25 and tail pieces 26 of the alternate blades 15 should become somewhat deformed by repeated contact so that they do not restore to their perfect, original cross-sections, the overlapping of the tails of the blades 15 and 16 and the crushing of the resilient nose pieces 25 in closed position, continues to provide a most effective sealing of the blades to each other throughout their lives.

FIG. 5 illustrates a damper embodying the invention which comprises a single blade generally indicated by the reference number 30. The blade 30 is also shown as being of rectangular plan view and of the same size and shape as the interior of a damper frame generally indicated by the reference number 31. The blade 30 has a resilient nose piece 32 and a flexible tail piece 33.

When the damper is in open position (as shown in FIG. 5) the nose piece 32 extends into the oncoming air flow and the tail piece 33 is downwind. A damper blade 30 according to the invention functions equally effectively whether used in a single blade damper or in a multiple blade damper with respect to the question of smoothing out the air flow and reduction of noise.

The blade 30 is mounted on a transversely extending shaft 34 and rotated, for example, by means of an actuating chain 35 which is meshed with a sprocket 36 pinned or otherwise secured on the end of the shaft 34.

Yet another modification of the invention is illustrated in FIG. 6 wherein a multiple blade damper comprises both alternate blades 15a and intermediates blades 16a. In this arrangement, however, the blade actuating mechanism (not shown) is so coupled to blade axes 17a that all of the blades, both resilient ended blades 15a and solid blades 16a, rotate in the same direction when moving from open to closed position.

In this arrangement of the two types of blades 15a and 16a, as is the case in the arrangement shown in FIG. 2, the solid intermediate blades 16 are engaged at each end by a resilient or flexible element at the edge of the next adjacent one of the alternate blades 15a. Thus a resilient tailpiece 26a of the uppermost blade 15a engages the solid nose of an intermediate blade 16a. Similarly, the solid tail of an intermediate blade 16a engages the resilient nose piece 25a of the next adjacent blade 15a.

FIG. 6 also illustrates an arrangement in which an even number of alternate end blades 15a and intermediate blades 16a are employed to close the opening in a damper frame 11a. Under these circumstances, for example, the uppermost one of the blades in the damper is an alternate blade 15a so that its flexible nose piece 25a engages the surface of the top frame member 13a. If this arrangement is employed, then the tail end of the lowermost one of the solid intermediate blades 16a will be engaged by a resilient cross stop 37. Of course, if desired, a solid intermediate blade 16a may be positioned on the uppermost one of the shafts 17a and, in such an arrangement, its solid nose would engage against a cross stop 37 (not shown) mounted on the top frame member 13a rather than on the bottom frame member 14a as shown in FIG. 6.

Having described my invention, I claim:

1. A gas flow control damper having a rectangular frame defining an opening through which the gases flow, a plurality of individual damper blades mounted in said frame by parallel axes, said blades being rectangular in plan and having substantially identical air-foil cross-section, and means operatively connecting said blades for simultaneous rotation on said axes from an open position to a closed position, alternate ones of said blades having resilient nose and tail edges and intermediate ones of said blades having solid nose and tail edges, said alternate and intermediate blades contacting each other in edge-to-edge contact when said damper blades are rotated to closed position and the noses and tails, respectively, of all of said blades extending in the same direction when said blades are in open position.

2. A damper according to claim 1 in which the means for rotating the blades rotates alternate blades in one direction and the intermediate blades in the other direction and the blades engage in nose-to-nose and tail-to-tail contact in closed position.

3. A damper according to claim 1 in which there are an unequal number of alternate and intermediate damper blades with the alternate ones of said blades numbering one more than the intermediate blades and wherein the resilient noses and tails of the outermost ones of said alternate blades engage the respective parallel members of the frame when said blades are in closed position.

* * * * *